P. H. DAVIS.
AUTOMATIC STOCK COUNTER.
APPLICATION FILED JULY 26, 1909.
950,279.
Patented Feb. 22, 1910.
3 SHEETS—SHEET 1.
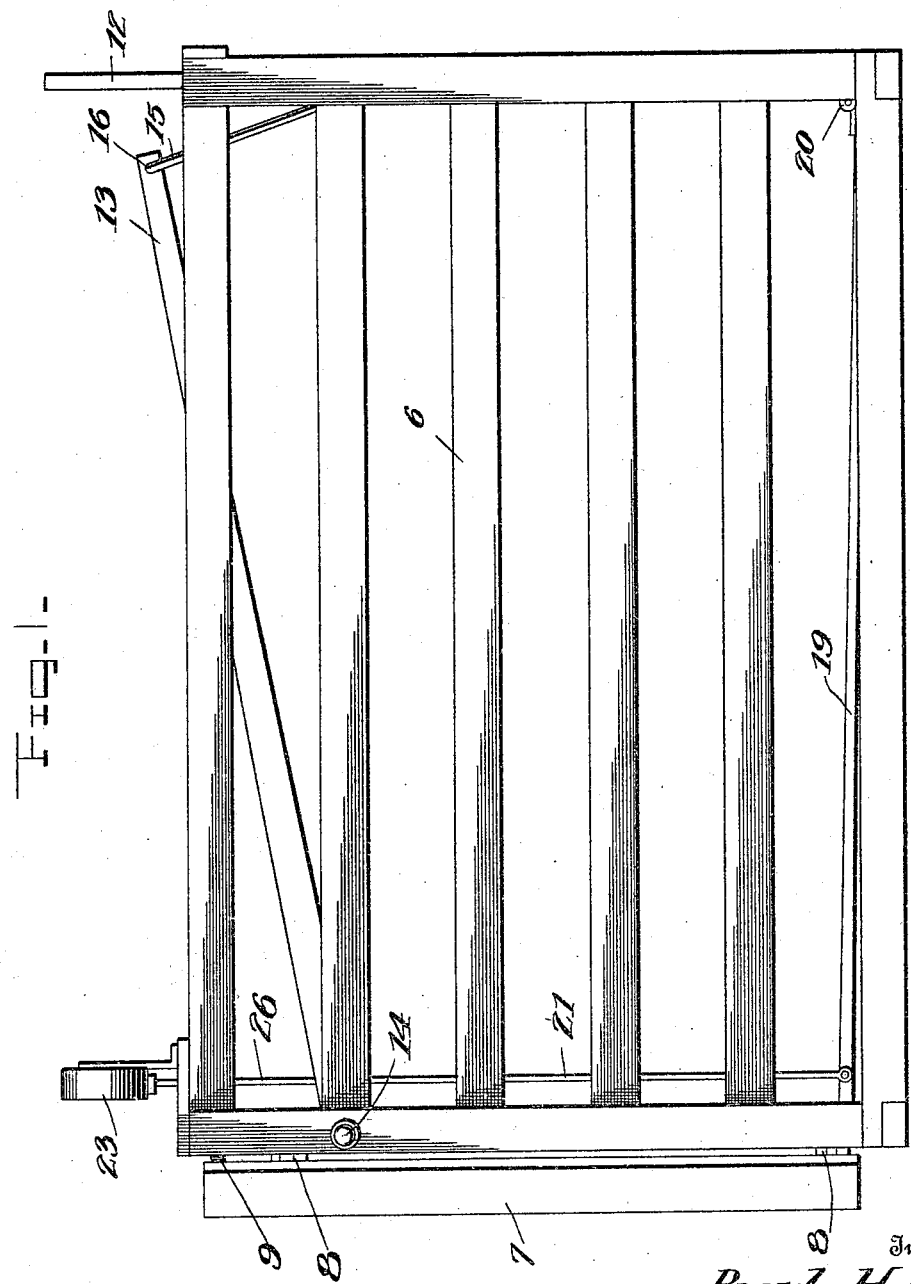
Witnesses
Inventor
Pearley H. Davis
By William W. Deane,
his Attorney

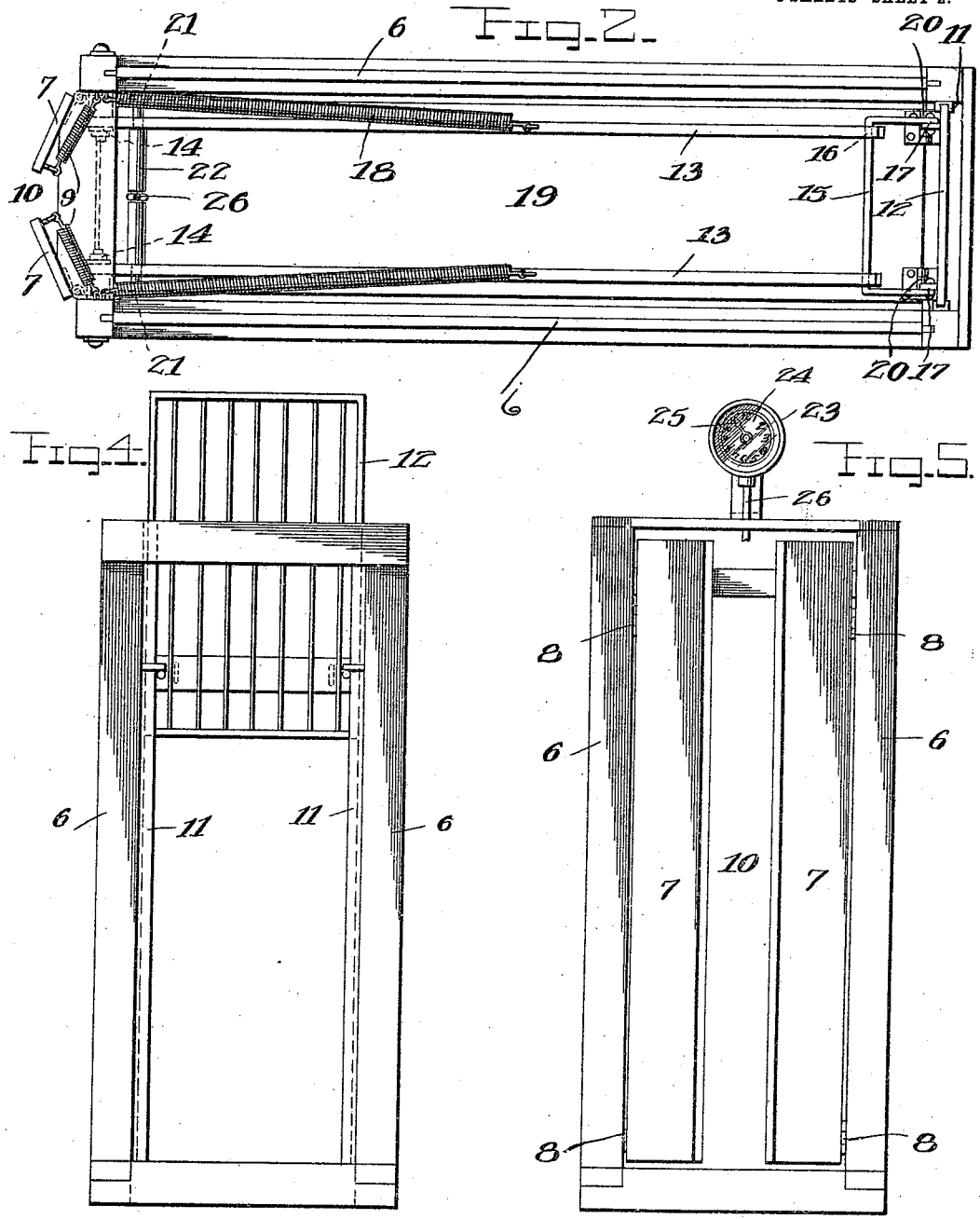

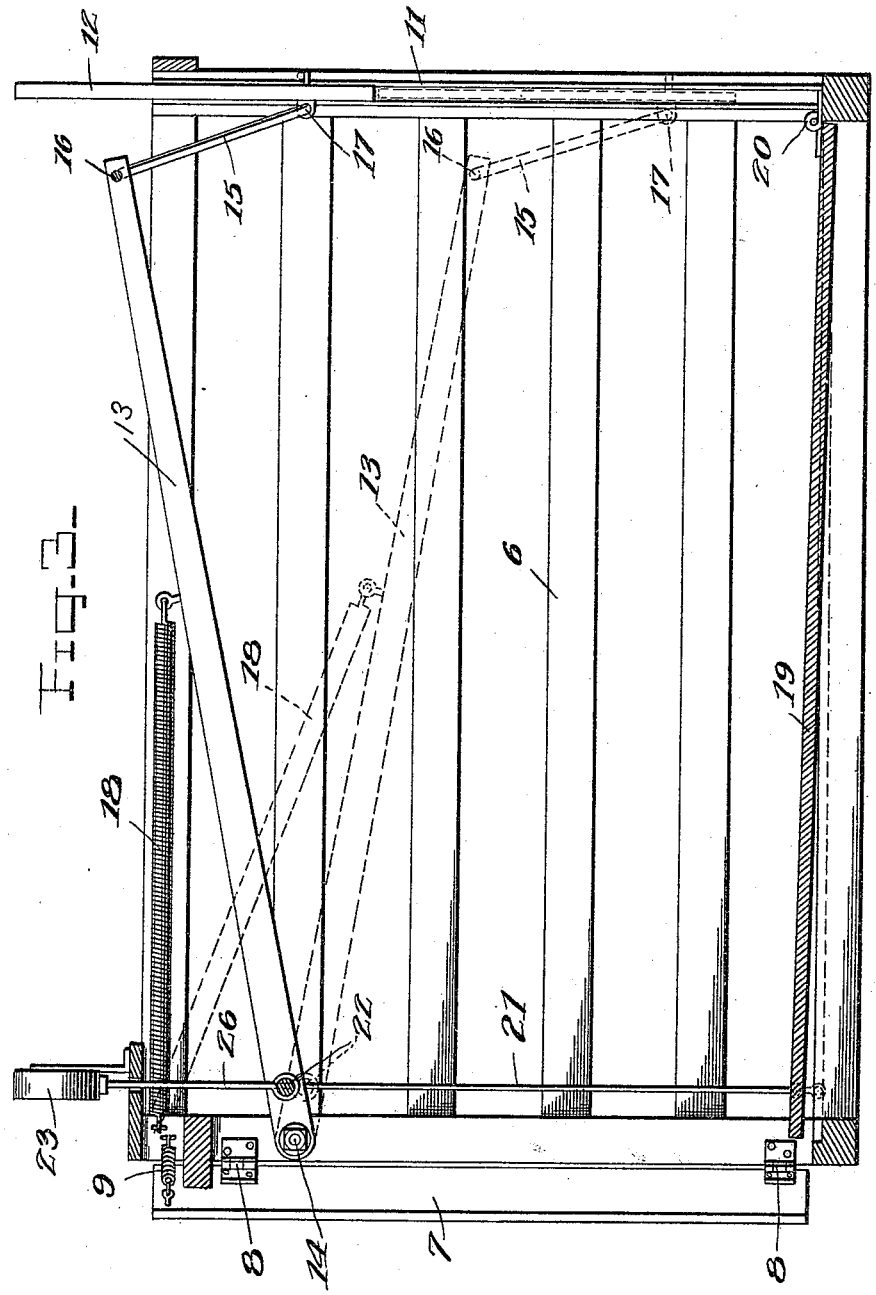

UNITED STATES PATENT OFFICE.

PEARLEY H. DAVIS, OF CINCINNATI, IOWA.

AUTOMATIC STOCK-COUNTER.

950,279.

Specification of Letters Patent.   Patented Feb. 22, 1910.

Application filed July 26, 1909. Serial No. 509,703.

*To all whom it may concern:*

Be it known that I, PEARLEY H. DAVIS, a citizen of the United States, residing at Cincinnati, in the county of Appanoose and State of Iowa, have invented certain new and useful Improvements in Automatic Stock-Counters, of which the following is a specification.

The primary object of the present invention is to provide novel mechanism for automatically counting sheep, hogs or other animals that pass a given point, as for instance, passing into or out of a corral, or yard, and is designed to take the place of the method now in general use of tallying by motion of the hand, and mental processes.

A further object is to provide a structure which will correctly count by permitting but one animal at a time to pass through, but will permit such passage in rapid succession.

The preferred form of construction is illustrated in the accompanying drawings, and is described in the following specification, but it will be obvious from an inspection of the claims hereto appended that the invention is not necessarily limited to the structure disclosed.

In the drawings:—Figure 1 is a side elevation of the apparatus. Fig. 2 is a top plan view of the same. Fig. 3 is a longitudinal sectional view indicating the sliding gate in different positions. Figs. 4 and 5 are respectively views in elevation of the opposite ends.

Similar reference numerals designate corresponding parts in all the figures of the drawings.

In the embodiment illustrated, a passageway is provided, being formed with suitable side walls 6, which may be of spaced slats or boards, or may be continuous walls, as desired. The outlet end of this passageway is controlled by outwardly swinging doors 7 hinged to the side walls, as shown at 8, and normally held in closed position by springs 9 that will permit said doors to be forced open. The doors, when in their closed position, as shown more particularly in Fig. 5, have an open space 10 between them, which will indicate to an animal in the passageway that it can force its way through these doors. The other or inlet end of the passageway is provided with vertical guideways 11, in which is mounted a vertically slidable gate 12. A lever, preferably, comprising spaced arms 13, is fulcrumed, as shown at 14, just in rear of the doors 7, and a U-shaped yoke or link 15, pivotally engaged with the free ends of the arms 13, as shown at 16, is also pivotally connected at 17 to the vertically sliding door 12. The arms 13 are normally held in elevated position by springs 18 that are connected thereto, and are also connected to the side walls. These springs therefore normally maintain the gate 12 in elevated position, but permit said gate to move downwardly upon the downward movement of the lever arms 13.

The floor of the passageway consists of a depressible platform 19 hinged contiguous to the end of said passageway having the sliding gate, as shown at 20. The free end of the platform has pivoted thereto, the lower ends of links 21, and the upper ends of these links are connected to a cross bar 22 that connects the lever arms 13. Mounted upon the top of the passageway is a suitable tally, counter or register 23, which may be of any desired construction, and in the form shown, has a number dial 24, over which registers a rotatable pointer 25. The actuator for the pointer is shown at 26, and has a connection with the cross bar 22 of the lever arm.

The operation of the apparatus may be briefly described as follows. The inlet end of the passageway is located at the gate or doorway of the yard, corral, or other confining means for the animal, and in the normal position of the parts, the vertically sliding gate 12 is elevated, while the doors 7 are closed. But one animal can enter the passageway at a time, and as it does so, it walks upon the platform 19. This depresses said platform, thereby swinging downwardly the lever arms 13 against the action of the springs 18, and lowering the gate 12, preventing the ingress of a succeeding animal. This downward movement of the lever effects a movement of the operating device 26, and the pointer 25 is moved one increment to register or tally. The animal, which passes on through, opens the doors. As soon as the animal has passed out, the parts reassume their normal position, permitting the entry of another animal, while the doors 7 automatically close, and prevent the reëntry of the animals that have passed through.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is:—

1. In apparatus of the character set forth, the combination with a passageway, of a depressible platform hinged at one end therein, a vertically slidable gate located at the hinged end of the platform, a lever fulcrumed at one end above the free end of the platform, a link connection between the free end of the platform and the portion of the lever adjacent the fulcrum thereof, a link connection between the free end of the lever and the vertically slidable gate, and a spring connected to the lever and adapted to be put under tension by depression of the free end thereof and also adapted, when the platform is relieved of weight, to raise the free end of the lever and the gate.

2. In apparatus of the character set forth, the combination with a passageway, of outwardly opening doors located at one end thereof, means for yieldingly maintaining the doors in closed position, a vertically sliding gate located at the other end of the passageway, a depressible platform constituting the bottom of the passageway and hinged at the end having the vertically slidable gate, a lever comprising two arms hinged above the free ends of the platform, a link connection between the free ends of the arms and the slidable gate, means connected to each arm for normally holding the gate in raised position, a cross bar connecting the arms contiguous to the fulcrum axis, and a link connection between the cross bar and the free end of the platform.

3. In apparatus of the character set forth, the combination with a passageway, of a depressible platform hinged at one end therein, a vertically slidable gate located at the hinged end of the platform, a lever fulcrumed at one end above the free end of the platform, a link connection between the free end of the platform and the portion of the lever adjacent the fulcrum thereof, a link connection between the free end of the lever and the vertically slidable gate, a spring connected to the lever and adapted to be put under tension by depression of the free end thereof and also, adapted, when the platform is relieved of weight, to raise the free end of the lever and the gate, opposite horizontally-swinging doors normally resting in position to obstruct the forward end of the passageway, and tractile springs connected to said doors and adapted to yieldingly retain the same in and return the same to the normal position.

In testimony whereof I affix my signature in presence of two witnesses.

PEARLEY H. DAVIS.

Witnesses:
P. S. DAVIS,
J. C. McDONALD.